United States Patent [19]

Lee et al.

[11] Patent Number: 4,742,508
[45] Date of Patent: May 3, 1988

[54] DISK DRIVING SYSTEM

[75] Inventors: Seong-Joong Lee, Suwon; Jae-Young Kho, Seoul, both of Rep. of Korea

[73] Assignee: Sam Sung Electronics Co., Ltd., Suwon, Rep. of Korea

[21] Appl. No.: 897,114

[22] Filed: Aug. 15, 1986

[30] Foreign Application Priority Data

Aug. 16, 1985 [KR] Rep. of Korea .............. 85-5931

[51] Int. Cl.$^4$ ............................................. G11B 7/085
[52] U.S. Cl. ................................. 369/265; 369/32
[58] Field of Search ............... 369/32, 54, 58, 264, 369/265

[56] References Cited

U.S. PATENT DOCUMENTS 4,337,533  6/1982  Ando et al. .................. 369/265

FOREIGN PATENT DOCUMENTS 98160  6/1982  Japan ............................ 369/58

Primary Examiner—William H. Beha, Jr.
Attorney, Agent, or Firm—Watson, Cole, Grindle & Watson

[57] ABSTRACT

An improved disk driving system for selectively driving one of the compact disk and the video disk is provided with respect to an optic pickup. A compact disk driving motor and a video disk driving motor are installed in line by the respective suitable motor fixing means at the opposite sides of the pick up in a longitudinal axis of a pickup carriage.

A driven pinion engaged with the rack of one slider member of said pickup carriage is coupled to the shaft of the first potentiometer for generating a pickup positioning signal upon video disk tracking. A follower gear engaged with said driven pinion is coupled to the shaft of the second potentiometer for generating a pickup positioning signal upon compact disk tracking.

The above, different pickup positioning signals are alternatively occurred.

2 Claims, 2 Drawing Sheets

U.S. Patent  May 3, 1988  Sheet 1 of 2  4,742,508

DISK DRIVING SYSTEM

BACKGROUND OF THE INVENTION

This invention relates generally to improvements in a disk driving system, and more specifically, to an improved disk driving system for selectively driving one of the compact disk and the video disk with respect to an optic pickup.

Known disk driving system for driving both a compact disk and a video disk in a deck, is constructed as follows. A motor for driving a turntable for loading a compact disk of 12 cm in diameter (hereinafter abbreviated as CD driving motor) and a motor for driving a turntable for loading a video disk of 20 cm or 30 cm in diameter (hereinafter abbreviated as VD driving motor) are provided on the motor holder, maintaining a predetermined angle between each other, and a pickup carriage for carrying an optic pickup is adapted to travel for and far from the motor holder by means of a transferring means. Further, three sensors for discriminating size of the disks loaded on a turntable are provided corresponding to said three kinds of disk. In case that one of three kinds of disk are detected by said sensors, the motor holder is rotated in a direction perpendicular to the longitudinal axis of the pickup carriage by means of rotating of the positioning control shaft mounted on its peripherals so that a compact disk turntable or a video disk turntable be aligned with the pickup on the carriage.

Therefore, those conventional disk driving systems must be provided with the positioning control means as like a positioning motor and precise gear members etc., which used to malfunction due to complexity of mechanical operations. Also, said turntables would often fail to align with the pickup, in result the output signal of the pickup lacks of stability in a level with respect to one revolution of a disk. Moreover, the disk on the turntable being sometimes contacted with the pickup, cause the expensive pickup to be seriously damaged. Further, those disk driving systems have disadvantage not to load both a compact disk and a video disk on turntables in a deck because of constructional restriction of said motor holder.

SUMMARY OF THE INVENTION

The primary object of the invention is to provide an improved disk driving system obviating pivotal movement of the turntable assembly for alignment with the pickup.

The second object of the invention is to provide a novel disk driving system having a turntable for compact disk and a turntable for video disk arranged at the opposite sides of the pickup in a longitudinal axis of the pickup carriage, two motors for driving said turntables being fixedly mounted by suitable motor fixing means.

The third object of the invention is to provide an effective disk driving system for allowing a compact disk and a video disk to be simultaneously loaded on the respective turntables in a deck.

The fourth object of the invention is to provide a disk size discriminating apparatus for discerning size of various disks, which is equipped with an operation mode selecting switch and two optic sensors for detecting existance of a disk on the disk receiving table.

In accordance with a preferred embodiment of the invention, it is provided an improved disk driving system comprising at least a pickup carriage for carrying an optic pickup reading out the information recorded on the disk and having two slider members on its opposed sides; a pinion engaged with a rack mounted on the side surface of the first slider member of said pickup carriage for axial travelling said pickup carriage along a guide rod in response to rotation of a pinion driving motor; a compact disk driving motor having a compact disk turntable fixed at the end of said motor shaft; and a video disk driving motor having a video disk turntable fixed at the end of said motor shaft, wherein said compact disk driving motor and said video disk driving motor are fixedly installed by suitable motor fixing means at the opposite sides of said pickup carriage; and a driven pinion is engagably provided on the rack mounted on the side surface of the second of said slider members and coupled to the shaft of the first potentiometer, said first potentiometer generating a pickup positioning signal upon video disk tracking in response to rotation of said driven pinion; and a follower gear is engaged with said driven pinion and coupled to the shaft of the second potentiometer, said second potentiometer generating a pickup positioning signal upon compact disk tracking in response to rotation of said follower gear; and also a compact disk receiving table and a video disk receiving table are respectively provided above said associated turntables.

In accordance with another embodiment of the invention, it is provided an improved disk driving system including a disk size discriminating circuit comprising:

two optic sensors respectively arranged under the peripheral bottoms of regions for receiving video disks of 20 cm and 30 cm in diameter in said video disk receiving table, each of said optic sensors having a light emitting device for generating light of pulse train type during a period of time and a photo detector for receiving light reflected by the disk on each of said disk receiving tables; and an operation mode selecting switch cooperating with said optic sensors, whereby size of disks loaded on said disk receiving tables can be automatically or semi-automatically discriminated.

Other features and advantages of the present invention will become apparent from the following detailed description, taken in conjunction with the accompanying drawings, which illustrate by way of example the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
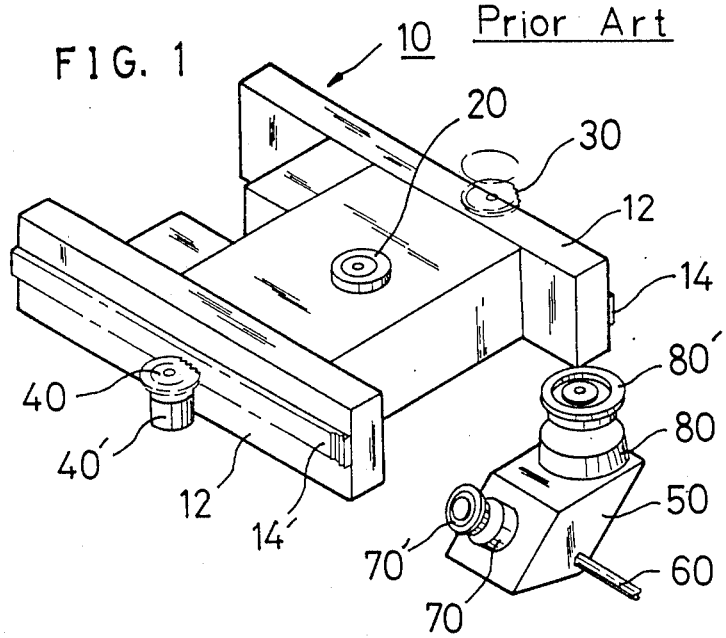
FIG. 1 is a perspective view illustrating a disk driving system of the prior art.

First, a prior disk driving system for selectively driving one of a compact disk and a video disk is described in connection with FIG. 1. In the drawing, numeral 10 indicates a pickup carriage for carrying a pickup 20 on its central part, said carriage 10 being provided with two slider member 12, 12' elongated in paralled. Under the slider members, as shown in FIG. 2, are arranged a guide rod 16 for supporting it. Also, a rack 14 is mounted on the outer side of the first slider member 12 and engaged with a pinion 30, which causes the pickup carriage 10 to travel along the guide rod 16 via the rack 14 by rotating in response to torque of a pinion driving motor (not shown). Further, another rack 14' is mounted on the outer side of the second slider member 12' and engagably coupled with a driven pinion 40 which is installed at the end of the shaft of a potentiometer 40'. Axial movement of the pickup carriage 10 makes said driven pinion 40 rotate, and therefore it allows the potentiometer 40' to generate the pickup positioning signal for the purpose of controlling the pinion driving motor during disk tracking.

In a longitudinal axis of the pickup carriage 10 is installed a motor holder 50, which is adapted to pivotally rotate in a direction perpendicular to said longitudinal axis by means of a positioning control shaft 60 mounted on its peripherals. On the motor holder 50, a CD driving motor 70 for driving a compact disk turntable 70' and a VD driving motor 80 for driving a video disk turntable 80' are provided, maintaining a predetermined angle between each other.

Under these constructions, when three optic sensors provided corresponding to three kinds of disk (i.e., a compact disk of 12 cm in dia., two video disks of 20 cm and 30 cm in dia.) find out size of the disk loaded, the aforementioned motor holder 50 make the associated driving motor 70 or 80 align with the pickup 20 by rotating at a predetermined angle by means of the positioning control shaft 60. Hence, a control unit as like a microprocessor would generate a control signal for the pinion driving motor based upon the pickup positioning signal from the potentiometer 40' and therefore the controlled driving pinion 30 enables the pickup carriage 10 to travel toward the aligned turntable 70' or 80' for disk tracking.

However, as stated above, the disk driving system of the prior art must not only be additionally equipped with the precise positioning control means of said motor holder as like a positioning motor and gear members etc., which are liable to malfunction, but also often come to a situation in which the pickup 20 and the turntable 70' or 80' have not exactly been aligned with. As a result, the output signal of the pickup 20 lacks of stability in a level, and moreover the disk on a certain turntable is in touch with the pickup 20 so that the optic pickup 20 might be damaged in case an error of said misalignment is high.

Figure 2:
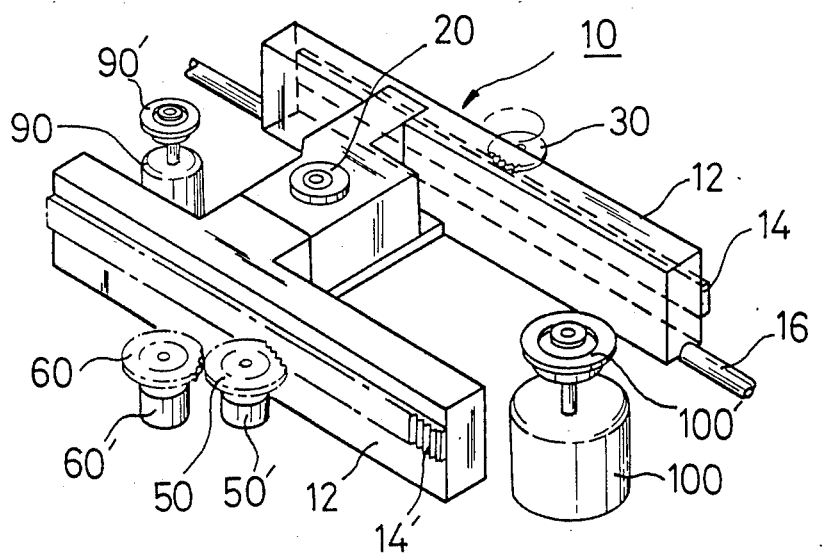
FIG. 2 is a perspective view illustrating a disk driving system of the present invention.
Figure 3:
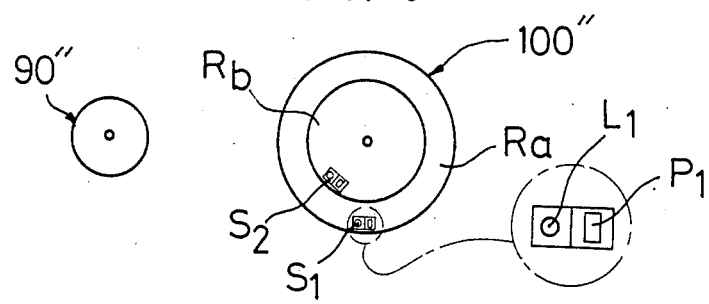
FIG. 3 is a schematic top view showing a compact disk receiving table and a video disk receiving table respectively provided above the associated turntables.
Figure 4:
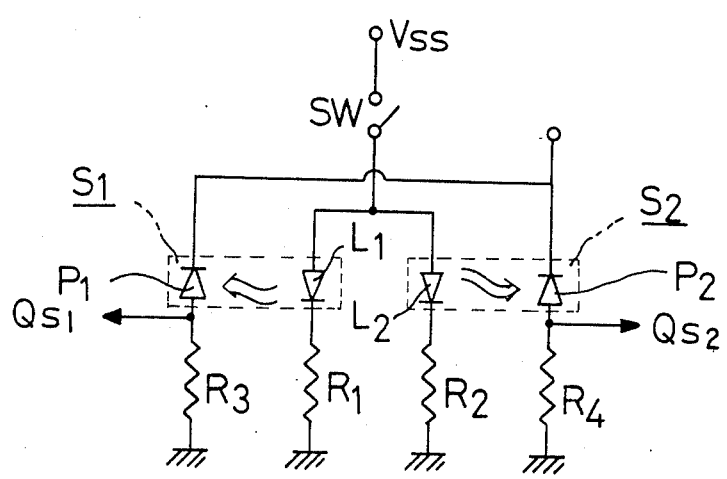
FIG. 4 is a diagram of an embodiment of a disk size discriminating circuit according to the present invention.

Next, FIG. 2 to FIG. 4 illustrate an improved disk driving system embodying the present invention to overcome the captioned problems of the conventional one.

Referring to FIG. 2, the components or parts same as the ones shown in FIG. 1 are assigned with identical numerals. According to an embodiment of the present system, a CD driving motor 90 and a VD driving motor 100 are respectively installed by suitable motor fixing means (not shown) at the opposite sides of the pickup 20 in a longitudinal axis of a pickup carriage 10. Said driving motors 90 and 100 are provided with a compact disk turntable 90' and a video disk turntable 100' at top ends of their shafts. Further, a rack 14' mounted on the outer side of the second slider member 12 of the pickup carriage 10 is engaged with a driven pinion 50, and the driven pinion 50 is in turn engaged with a follower gear 60. At the central parts of the driven pinion 50 and the follower gear 60 are fixed the rotating shafts of the first and the second potentiometers 50' and 60'. In operation, said first potentiometer 50' generates one pickup positioning signal upon video disk tracking in response to rotation of said driven pinion 50 while said second potentiometer 60' generates another pickup positioning signal upon compact disk tracking in response to rotation of said follower gear 60; so to speak, the above, different pickup positioning signals are alternatively occurred. More specifically, when the driving pinion 30 is rotated in clockwise, the pickup carriage 10 travels toward the CD driving motor 90 along the guide rod 16, at the same time the driven pinion 50 is rotated in counterclockwise with the first potentiometer 50' being nonoperative and the follower gear 60 is rotated in clockwise with the second potentiometer 60' producing the positioning signal of the pickup 20 for the purpose of controlling a pinion driving motor connected to the driving pinion 30. On the other hand, when the driving pinion 30 is rotated in counterclockwise, the pickup carriage 10 travels toward the VD driving motor 100, at the same time said driven pinion 50 and said follower gear 60 are rotated contrary to the above with only the first potentiometer 50' producing the positioning signal of the pickup 20.

FIG. 3 shows schematically a compact disk receiving table 90" and a video disk receiving table 100" respectively provided above the compact disk turntable 90' and the video disk turntable 100'. In operation, each disk receiving table 90" or 100" charged with a desired disk is adapted to descend nearly to the associated turntable 90" or 100", and at the time said turntable correlatively lifts up the disk from the disk receiving table through a now shown cavity formed at the central portion of the receiving table at a predetermined spacing and rotates the disk. The video disk receiving table 100" is comparted into the region Ra for receiving a video disk of 30 cm in dia. and the region Rb for receiving a video disk of 20 cm in dia. and two optic sensors $S_1$ and $S_2$ for detecting size of a video disk is provided under the peripheral bottoms of the respective regions Ra and Rb. Each optic sensor $S_1, S_2$ consists of a light emitting device $L_1$, $L_2$ for generating light of pulse train type repeated by the period of several tens of millisecond and a photo detector $P_1$, $P_2$ for receiving light reflected by the disk on said video disk receiving table.

FIG. 4 shows an embodiment of a disk size discriminating circuit according to the present invention, having two optic sensors $S_1$, $S_2$ and an operation mode selecting switch SW. As shown in the figure, a power source Vss is commonly connected with anodes of light emitting devices $L_1$ and $L_2$ via an operation mode selecting switch SW, and cathodes of light emitting devices $L_1$ and $L_2$ are grounded via resistor $R_1$ and $R_2$. Further, a power source $-V_{ss}$ is also commonly connected with cathodes of photo detectors $P_1$ and $P_2$ and their anodes are grounded via resistor $R_3$ and $R_4$. Nodes between said photo detectors $P_1$, $P_2$ and said resistors $R_3, R_4$ are utilized as output terminals $Q_{s1}$, $Q_{s2}$ of the disk size discriminating circuit.

It will be described about the operation of the disk size discriminating circuit as illustrated in FIG. 3 and FIG. 4.

Af first, it is assumed that the operation mode selecting switch SW is turned on. If a video disk of 20 cm in dia. has been charged in the video disk receiving table 100", only light emitted from the light emitting device $L_2$ is reflected on the bottom side of said video disk and enters the photo detector $P_2$, and hence the photo detector $P_2$ is activated to obtain the potential $-Vss$ (hereinafter represented as "1" in negative logic) at the output $Q_{s2}$ while the photo detector $P_1$ is not activated to obtain the ground potential (hereinafter represented as "0" in negative logic) at the output $Q_{s1}$. If the video disk receiving table 100" is occupied by a video disk of 30 cm in dia., lighting beams from light emitting devices $L_1$ and $L_2$ are reflected on the bottom side of said large video disk and enter the associated photo detectors $P_1$ and $P_2$, and therefore said photo detectors are activated, representing the potentials of logic 1 at the outputs $Q_{s1}$ and $Q_{s2}$ individually.

And in case that a compact disk of 12 Cm in dia. has only been charged in the compact disk receiving table 90", light beams from the light emitting devices L1 and L2 travels straight and never enter any of photo detectors P1 and P2 and so photo detectors P1 and P2 are not activated, all the outputs Qs1 and Qs2 being of the potentials of logic 0. When both a compact disk and a video disk are respectively charged in the compact disk receiving table 90" and the video disk receiving table 100", the disk size discriminating circuit takes the potentials of a pair of (1,0) or (1, 1)in logic value at the outputs Qs1 and Qs2 in accordance with size of the video disk charged in the table 100", causing the loaded video disk to be automatically played in preference to the compact disk.

But, in case that the operation mode selecting switch SW has been turned off contrary to the above cases, when both a compact disk and a video disk are respectively charged in the associated receiving tables 90" and 100", any of light emitting devices L1 and L2 never emit lighting beam, and therefore both the outputs Qs1 and Qs2 of the circuit represent the potentials of logic 0 for identifying a compact disk, causing the loaded compact disk to be played.

The following table generally illustrates disk discriminating procedures in accordance with cooperation of an operation mode selecting switch SW and two optic sensors S1 and S2.

TABLE

|  | SW | Qs1 | Qs2 | Detected Disk |
| --- | --- | --- | --- | --- |
| One Disk Loading | ON | 0 | 0 | CD |
|  |  | 0 | 1 | VD of 20 Cm in dia. |
|  |  | 1 | 1 | VD of 30 Cm in dia. |
| Two Disks Loading | ON | 0 | 1 | VD of 20 Cm in dia. |
|  |  | 1 | 1 | VD of 30 Cm in dia. |
|  | OFF | 0 | 0 | CD |

Now, it will be described about the operation of the pickup carriage 10 in response to the detected results of the disk size discriminating circuit.

On the one hand, when all the outputs Qs1 and Qs2 of said circuit are of logic 0, in other words the charged disk has been found out as a compact disk, the driving pinion 30 travels the pickup carriage 10 toward the compact disk turntable 90' by rotating in clockwise, and at the same time the follower gear 60 opposed with the pinion 30 also rotates in clockwise and enables the second potentiometer 60' to generate the pickup positioning signal upon compact disk tracking for the purpose of controlling the driving motor for the pinion 30.

On the other hand, when the outputs Qs1 and Qs2 of said circuit represent a pair of (0,1) or (1, 1) in logic value, in other words the charged disk has been found out as a video disk, the driving pinion 30 travels the pickup carriage 10 toward the video disk turntable 100" by rotating in counterclockwise, at the same time the driven pinion 50 engaged with the rack 14" of the carriage 10 rotates in clockwise and enable the first potentio meter 50' to generate the pickup positioning signal upon video disk tracking for the purpose of controlling the driving motor for the pinion 30.

As mentioned hereinbefore, according to an embodiment of the present invention, because a CD driving motor 90 and a VD driving motor 100 are installed in line by the respective suitable motor fixing means at the opposite sides of the pickup 20 in a longitudinal axis of a pickup carriage 10, such pivotal movement of said driving motors can be obviated and the central axes of said pickup 20 and said motors 90, 100 are always maintained in parallel, in results the disk loaded on the turntable is ensured to rotate at a predetermined intervals with the pickup 20 for safe reading out the information recorded on the disk. Moreover, this invention facilitates simultaneously loading of both a compact disk and a video disk on the respective turntable of its own in a deck.

What is claimed is:

1. An improved disk driving system comprising at least a pickup carriage for carrying an optic pickup reading out the information recorded on the disk and having two slider members at its opposed sides; a pinion engaged with a rack mounted on the side surface of the first slider member of said pickup carriage for axial travelling said pickup carriage along a guide rod in response to rotation of a pinion driving motor; a compact disk driving motor having a compact disk turntable fixed at the end of said motor shaft; and a video disk driving motor having a video disk turntable fixed at the end of said motor shaft, wherein said compact disk driving motor and said video disk driving motor are fixedly installed by certain motor fixing means at the opposite sides of said pick up in a longitudinal axis of said pick up carriage; and a driven pinion is engagably provided on the rack mounted on the side surface of the second of said slider members and coupled to the shaft of the first potentiometer, said first potentiometer generating a pickup positioning signal upon video disk tracking in response to rotation of said driven pinion; and a follower gear is engaged with said driven pinion and coupled to the shaft of the second potentiometer, said second potentiometer generating a pickup positioning signal upon compact disk tracking in response to rotation of said follower gear; and also a compact disk receiving table and a video disk receiving table are respectively provided above said associated turntables.

2. The disk driving system of claim 1 including a disk size discriminating circuit comprising:
two optic sensors respectively arranged under the peripheral bottoms of regions for receiving video disks of 20 cm and 30 cm in diameter in said video disk receiving table, each of said optic sensors having a light emitting device for generating light of pulse train type during a period of time and a photo detector for receiving light reflected by the disk on each of said disk receiving tables; and an operation mode selecting switch cooperating with said optic sensors,
whereby size of disks loaded on said disk receiving tables can be automatically or semi-automatically discriminated.

* * * * *